US012638962B2

(12) United States Patent
Chimalamarri et al.

(10) Patent No.: US 12,638,962 B2
(45) Date of Patent: May 26, 2026

(54) GAZE TARGET FOR ACTIVATING USER INTERFACE ELEMENTS

(71) Applicant: Apple Inc., Cupertino, CA (US)

(72) Inventors: Anshu K. Chimalamarri, Sunnyvale, CA (US); Allison W. Dryer, Tiburon, CA (US); Benjamin S. Phipps, San Francisco, CA (US); Jessica Trinh, Oakland, CA (US); Nahckjoon Kim, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/896,234

(22) Filed: Sep. 25, 2024

(65) Prior Publication Data

US 2025/0103196 A1     Mar. 27, 2025

Related U.S. Application Data

(60) Provisional application No. 63/540,935, filed on Sep. 27, 2023.

(51) Int. Cl.
| | |
|---|---|
| G06F 3/04842 | (2022.01) |
| G06F 3/01 | (2006.01) |
| G06F 3/0483 | (2013.01) |
| G06F 3/0487 | (2013.01) |

(52) U.S. Cl.
CPC .......... G06F 3/04842 (2013.01); G06F 3/013 (2013.01); G06F 3/0483 (2013.01); G06F 3/0487 (2013.01)

(58) Field of Classification Search
None
See application file for complete search history.

(56) References Cited

U.S. PATENT DOCUMENTS

2016/0116980 A1 *   4/2016   George-Svahn ........ G06F 3/041
                                                              345/173

* cited by examiner

*Primary Examiner* — Aneeta Yodichkas
(74) *Attorney, Agent, or Firm* — Fernando & Partners, LLP

(57) ABSTRACT
A method includes displaying a user interface (UI) including a first UI element that is associated with a first UI operation and a second UI element that is associated with a second UI operation. The method includes, in response to detecting a first gaze input directed to one of the first UI element and the second UI element, displaying a visual indicator at a fixed location that is separate from the first UI element and the second UI element. The method includes, in response to detecting, via the eye tracker, a second gaze input directed to the visual indicator: performing the first UI operation in response to the first gaze input being directed to the first UI element, and performing the second UI operation in response to the first gaze input being directed to the second UI element.

20 Claims, 14 Drawing Sheets

300

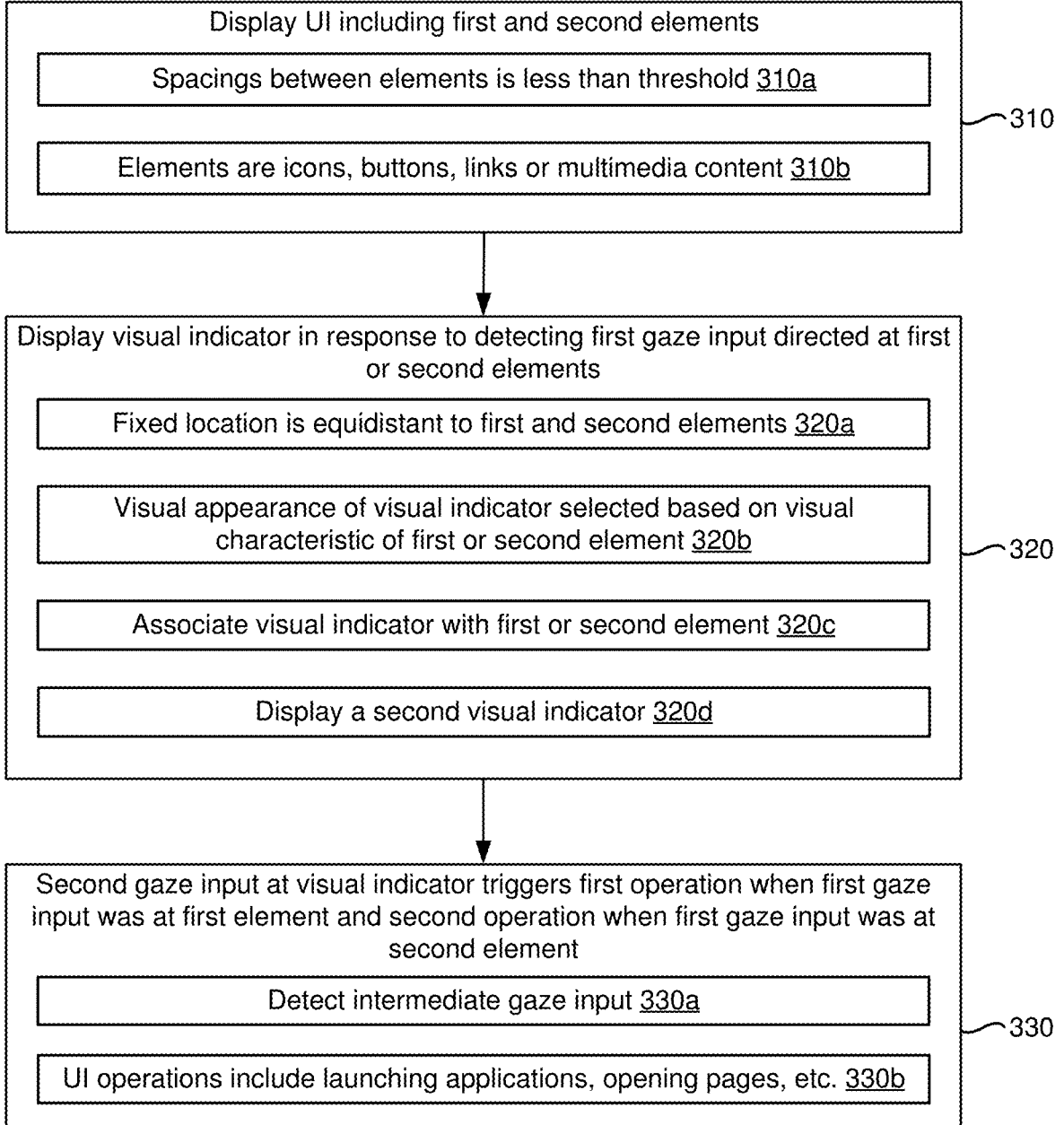

Display UI including first and second elements

Spacings between elements is less than threshold 310a

Elements are icons, buttons, links or multimedia content 310b

310

Display visual indicator in response to detecting first gaze input directed at first or second elements Fixed location is equidistant to first and second elements 320a Visual appearance of visual indicator selected based on visual characteristic of first or second element 320b Associate visual indicator with first or second element 320c Display a second visual indicator 320d

320

Second gaze input at visual indicator triggers first operation when first gaze input was at first element and second operation when first gaze input was at second element Detect intermediate gaze input 330a UI operations include launching applications, opening pages, etc. 330b

GAZE TARGET FOR ACTIVATING USER INTERFACE ELEMENTS

CROSS-REFERENCE TO RELATED APPLICATION

This application claims the benefit of U.S. Provisional Patent App. No. 63/540,935, filed on Sep. 27, 2023, which is incorporated by reference in its entirety.

TECHNICAL FIELD

The present disclosure generally relates to a gaze target for activating user interface elements.

BACKGROUND

Some devices include a display that presents content. The content may include a user interface with various user interface elements that can be selected by a user of the device. The user can select one of the user interface elements by providing a user input. The user may provide user inputs through various input devices such as a touchscreen, a mouse, a keyboard or via gaze. A device may include a camera that captures an image of the user's eyes and the device may determine a direction of a gaze based on the image of the user's eyes. Gaze tracking can be resource-intensive and/or inaccurate at times.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 is a flowchart representation of a method of selecting a user interface element based on gaze in accordance with some implementations.

Figure 1A:
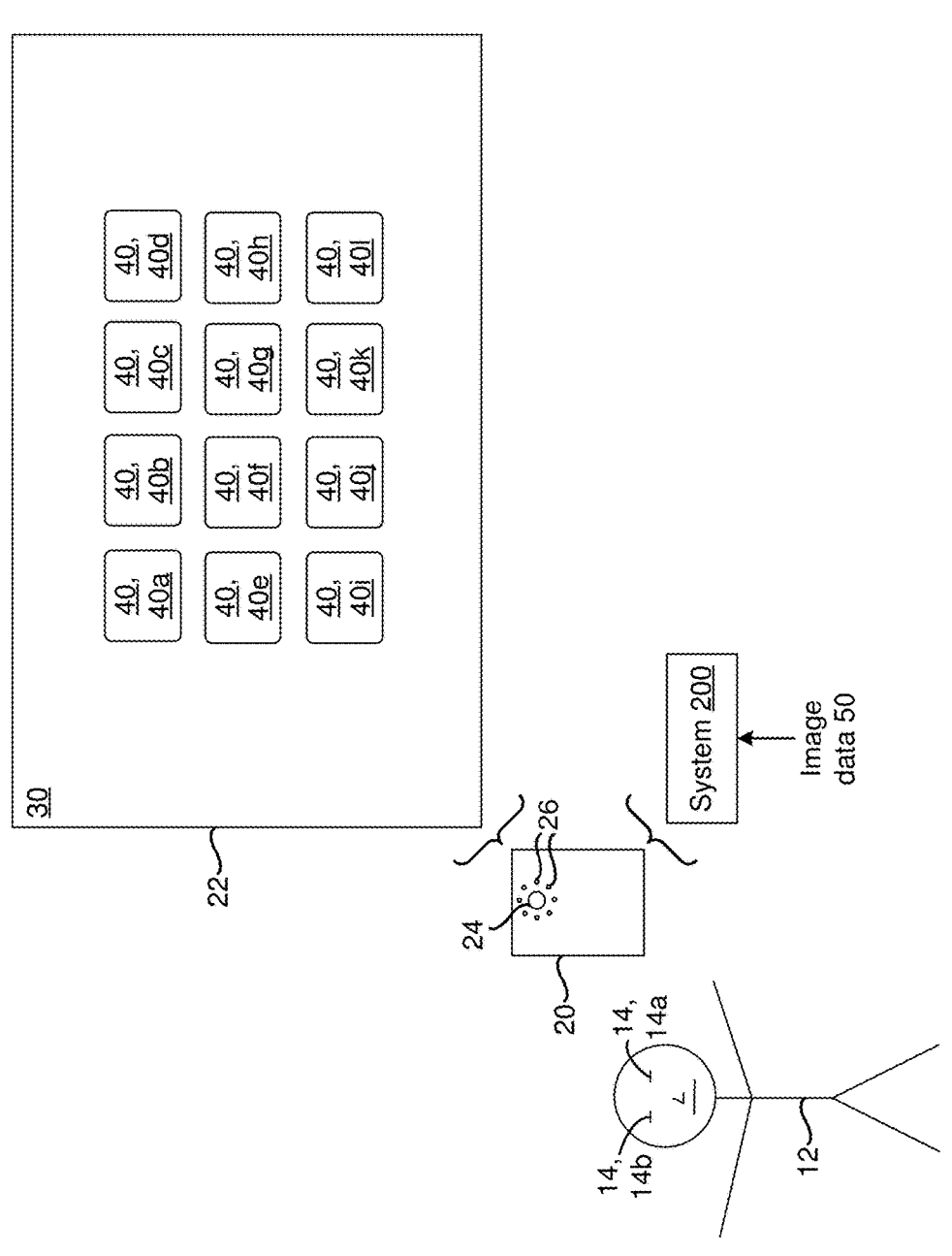
FIGS. 1A-1S are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for selecting a user interface element based on gaze. In some implementations, a method is performed by an electronic device including a non-transitory memory, one or more processors, a display and an eye tracker. In some implementations, the method includes displaying, on the display, a user interface (UI) including a first UI element that is associated with a first UI operation and a second UI element that is associated with a second UI operation. In some implementations, the method includes, in response to detecting, via the eye tracker, a first gaze input directed to one of the first UI element and the second UI element, displaying a visual indicator at a fixed location that is separate from the first UI element and the second UI element. In some implementations, the method includes, in response to detecting, via the eye tracker, a second gaze input directed to the visual indicator, performing the first UI operation in response to the first gaze input being directed to the first UI element. In some implementations, the method includes, in response to detecting, via the eye tracker, a second gaze input directed to the visual indicator, performing the second UI operation in response to the first gaze input being directed to the second UI element.

In accordance with some implementations, a device includes one or more processors, a plurality of sensors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Some devices utilize gaze as an input modality. A device may include a user-facing camera that captures images of an eye of a user. The device utilizes the captured images to determine a display position where the user is gazing, a direction of the user's gaze and/or a duration for which the user has been gazing at the display position. Some devices register a user selection of a user interface (UI) element after detecting that a gaze of the user was directed to that particular UI element for a certain amount of time. Gaze tracking can sometimes be inaccurate. For example, the user may inadvertently select a UI element by gazing at the UI element.

The present disclosure provides methods, systems, and/or devices for selecting a UI element via gaze. A device detects that the user is gazing at a first UI element from a collection of UI elements. After detecting that the user is gazing at the first UI element, the device displays a visual indicator at a fixed location. The visual indicator is not displayed prior to the user gazing at the first UI element. Gazing at the visual indicator serves as a confirmation that the user intended to select the first UI element. As such, if the user gazes at the visual indicator after gazing at the first UI element, the first UI element is activated and the device performs a first UI operation associated with the first UI element. For example, if the first UI element is a first icon for launching a first application, the device launches the first application when the user gazes at the first icon and subsequently gazes at the visual indicator. If the user initially gazes at a second UI element, the device still displays the visual indicator at the same fixed location. However, this time gazing at the visual indicator serves as a confirmation that the user intended to select the second UI element. As such, if the user gazes at the visual indicator after gazing at the second UI element, the second UI element is activated and the device performs a second UI operation associated with the second UI element. For example, if the second UI element is a second icon for launching a second application, the device launches the second application when the user gazes at the second icon and subsequently gazes at the visual indicator.

Using the visual indicator as a common secondary gaze target for confirming selection of various UI elements tends to conserve space in a UI with limited spacing. For example, some UIs may include UI elements that are closely packed together. In such closely packed UIs there may not be sufficient space to display dedicated secondary gaze targets for each of the UI elements. As such, the device conserves space by using the visual indicator as the common secondary gaze target that is shared by various UI elements. Using dedicated secondary gaze targets for each UI element may also preclude the device from displaying UI elements at display locations where the dedicated secondary gaze targets are supposed to be displayed thereby leaving less space available for UI elements. As such, using the visual indicator as the common secondary gaze target allows the device to display additional UI elements thereby using the display space more efficiently. The device displays the visual indicator at a fixed location regardless of which UI element the user initially gazes at so that the visual indicator predicably appears at the same location and the user does not have to search for the visual indicator after gazing at a particular UI element.

The device can display the visual indicator with a particular visual appearance that is based on a visual characteristic of a UI element that the user gazes at in order to trigger display of the visual indicator. The device may use color to associate the visual indicator with a UI element that the user gazed at just prior to the visual indicator being displayed. For example, the device displays the visual indicator as a blue circle in response to the user gazing at a blue button to indicate that gazing at the visual indicator confirms a selection of the blue button. As another example, the device displays the visual indicator as a red circle in response to the user gazing at a red button to indicator that gazing at the visual indicator confirms a selection of the red button. Additionally or alternatively, the device may change a color of the UI element that the user gazed at so that the color of the UI element matches a color of the visual indicator. For example, if all the UI elements are displayed with the same background color (e.g., blue), the device can change the background color of the UI element that the user gazed at to a different color (e.g., red) in order to match a color of the visual indicator.

Some UI elements are associated with multiple operations. For example, tapping a mail icon launches a mail application to a default state (e.g., Inbox), and a long press of the mail icon triggers display of a menu with more specific actions such as composing a new message, performing a search, viewing 'VIP' messages, etc. The device can concurrently display multiple visual indicators that trigger different operations associated with the previously gazed UI element. As an example, gazing at the mail icon causes the device to concurrently display a first visual indicator that, when gazed upon, launches the mail application to the default state and a second visual indicator that, when gazed upon, opens a message composition window.

The device provides the user with sufficient time for his/her gaze to travel from a UI element to the visual indicator in order to confirm selection of the UI element. A path from a location of the initially gazed-upon UI element to a location of the visual indicator is designated as a safe area allowing the user's gaze to travel along the path without triggering selection of other UI elements that coincide with the path. As such, if the gaze is moving from a first button to the visual indicator serving as a secondary target of the first button, then the gaze passing over a second button does not activate the second button. However, fixating on the second button can result in the safe area dissipating and trigger a selection of the second button. If the gaze lingers in the safe area without moving towards the visual indicator, then the safe area dissipates and the first button no longer remains selected.

The device may designate a particular display location as a trigger for displaying a home screen (e.g., a grid of icons for launching respective applications). When the device detects that the gaze is directed to that particular display location, the device displays the home screen. The display location for triggering display of the home screen may be a corner (e.g., the bottom left corner of the screen). The display location for triggering display of the home screen may be referred to as a 'hot corner'. As an example, the user gazes at a particular UI element. In this example, gazing at the particular UI element triggers display of the visual indicator that serves as a secondary gaze target for confirming selection of the particular UI element that the user gazed at. Continuing with this example, if the user gazes at the hot corner instead of gazing at the visual indicator, the device deselects the particular UI element and displays the home screen.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes an electronic device 20 and a user 12 of the electronic device 20. The user 12 has eyes 14 (e.g., a left eye 14*a* and a right eye 14*b*). In some implementations, the electronic device 20 includes a handheld computing device that can be held by the user 12. For example, the electronic device 20 may include a smartphone, a tablet, a media player, a laptop or the like that can be held by the user 12. Alternatively, in some implementations, the electronic device 20 includes a wearable computing device that can be worn by the user 12. For example, the electronic device 20 may include an HMD or an electronic watch that can be worn by the user 12.

In various implementations, the electronic device 20 includes a display 22, an image sensor 24 (e.g., a camera), a glint source 26 (e.g., a set of one or more light emitting diodes (LEDs)) and an eye tracking system 200 ("system 200", hereinafter for the sake of brevity). In various implementations, the display 22 displays a user interface (UI) 30 that includes various UI elements 40 (e.g., a first UI element 40*a*, a second UI element 40*b*, a third UI element 40*c*, . . . , and a twelfth UI element 401). In some implementations, the UI 30 is referred to as a graphical user interface (GUI) and the UI elements 40 are referred to as GUI elements. In some implementations, the UI 30 is a part of an extended reality (XR) environment and the UI elements 40 are virtual objects that are displayed within the XR environment. In various implementations, the UI elements 40 include user-selectable affordances such as icons, buttons, drop-down boxes, text fields for receiving text input, expandable information panels, links (e.g., hyperlinks for web pages or uniform resource identifiers (URIs) for application screens), playable multimedia content (e.g., a thumbnail image representing an audio content item such as an album or a song, or a video content item such as a music video, TV show or a movie), etc. In some implementations, the UI elements 40 display text, a graphic, an image and/or a video. In some implementations, the UI elements 40 are associated with respective visual characteristic values (e.g., respective background colors, respective sizes, respective font colors, respective font styles, etc.).

In some implementations, a user activation of a particular one of the UI elements 40 triggers the electronic device 20 to perform a respective UI operation. For example, a user activation of the first UI element 40a triggers the electronic device 20 to perform a first UI operation, a user activation of the second UI element 40b triggers the electronic device 20 to perform a second UI operation, . . . , and a user activation of the twelfth UI element 40l triggers the electronic device 20 to perform a twelfth UI operation. In some implementations, the UI 30 represents a home screen and the UI elements 40 represent respective icons for launching corresponding applications installed on the electronic device 20. For example, the first UI element 40a represents a news application icon for launching a news application installed on the electronic device 20, the second UI element 40b represents an instant messaging icon for launching an instant messaging application, the third UI element 40c represents a calendar application icon for launching a calendar application, the fourth UI element 40d represents a music application icon for launching a music application, the fifth UI element 40e represents a camera application icon for launching a camera application, and the sixth UI element 40f represents a mail application icon for launching a mail application installed on the electronic device 20.

Figure 1B:
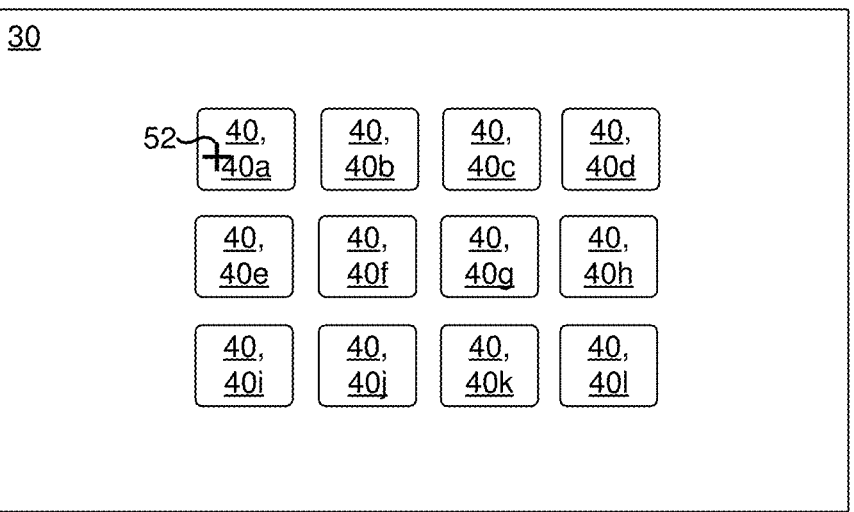
Figure 1C:
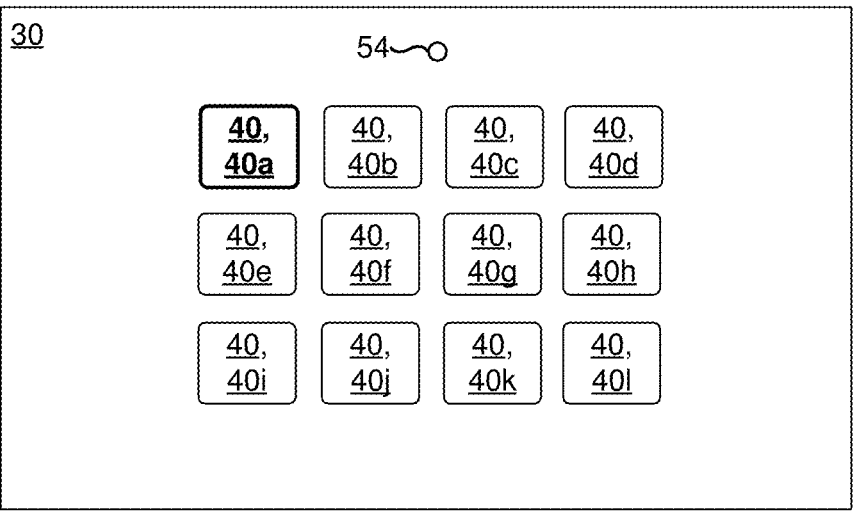

In various implementations, the system 200 obtains image data 50 from the image sensor 24. The image data 50 includes a set of one or more image of the eyes 14 of the user 12. Referring to FIG. 1B, the system 200 utilizes the image data 50 to detect a gaze input 52. The gaze input 52 indicates that the user 12 is gazing at the first UI element 40a. Referring to FIG. 1C, the electronic device 20 displays a visual indicator 54 in response to detecting the gaze input 52 at a location corresponding to the first UI element 40a. The visual indicator 54 serves as a secondary gaze target for confirming a user selection of the first UI element 40a. The gaze input 52 operates as a preliminary selection of the first UI element 40a. However, the electronic device 20 does not activate the first UI element 40a prior to the user 12 gazing at the visual indicator 54 in order to confirm the preliminary selection of the first UI element 40a. As such, the gaze input 52 coinciding with the first UI element 40a does not immediately trigger the electronic device to perform a UI operation associated with the first UI element 40a. For example, if the first UI element 40a is a news icon for a news application, merely gazing at the news icon does not cause the electronic device 20 to launch the news application. In this example, in order to launch the news application, the user 12 has to gaze at the news icon and then subsequently gaze at the visual indicator 54 in order to confirm his/her intention to launch the news application thereby reducing a likelihood of inadvertently launching the news application.

As illustrated in FIG. 1C, the electronic device 20 displays the visual indicator 54 at a location that is separate from the first UI element 40a. In the example of FIG. 1C, the visual indicator 54 is displayed at a location that does not coincide with any of the UI elements 40. In some implementations, the electronic device 20 displays the visual indicator 54 at a location where user-selectable UI elements are typically not displayed. In some implementations, the electronic device 20 displays the visual indicator 54 at a predetermined location (e.g., a predesignated location). In some implementations, the visual indicator 54 is displayed at a location that is reserved for confirming preceding gaze selections. In the example of FIG. 1C, the visual indicator 54 is displayed adjacent to a top edge of the display 22. However, the visual indicator 54 may be displayed in other portions of the display 22 (e.g., adjacent to a bottom edge of the display 22, at a center of the display 22 or near a corner of the display 22).

In the example of FIG. 1C, the electronic device 20 has indicated the user selection of the first UI element 40a by varying a visual appearance of the first UI element 40a while maintaining respective visual appearances of a remainder of the UI elements 40. For example, the electronic device 20 displays text included within the first UI element 40a in bold while not bolding text included within the remainder of the UI elements 40. As another example, the electronic device 20 displays a border of the first UI element 40a with a thicker outline while not thickening borders of the remainder of the UI elements 40. Varying the visual appearance of the first UI element 40a indicates that the visual indicator 54 is associated with the first UI element 40a and that gazing at the visual indicator 54 will trigger an activation of the first UI element 40a thereby causing the electronic device 20 to perform the first UI operation associated with the first UI element 40a.

Figure 1D:
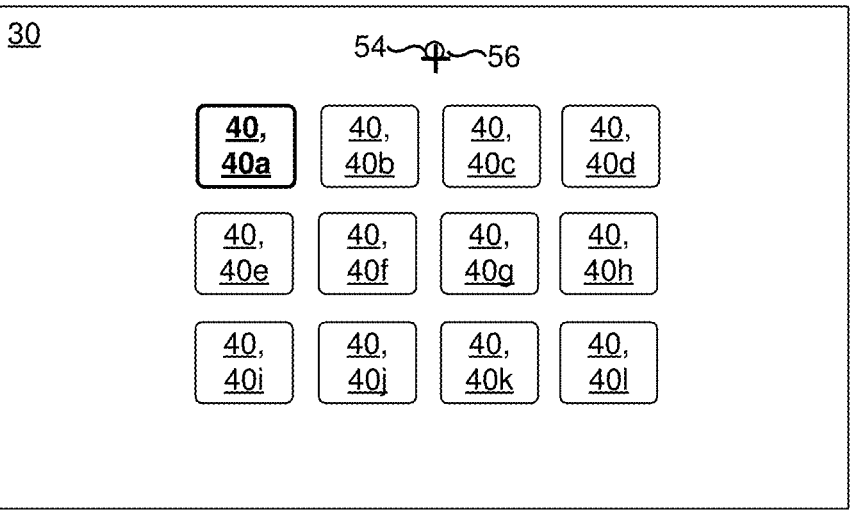
Figure 1E:
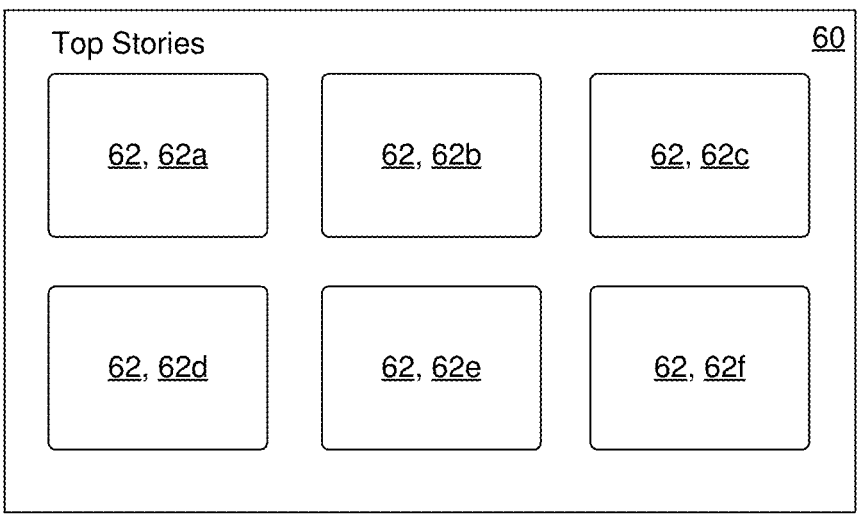

Referring to FIGS. 1D and 1E, the electronic device 20 detects a gaze input 56 at a location corresponding to the visual indicator 54. The gaze input 56 serves as a confirmation of an intent of the user 12 to activate the first UI element 40a and perform the UI operation associated with the first UI element 40a. In response to detecting the gaze input 56 directed to the visual indicator 54, the electronic device 20 displays a news home page 60 with UI elements 62 representing new stories (e.g., a UI element 62a representing a first news story, a UI element 62b representing a second news story, . . . , and a UI element 62f representing a sixth news story). Similar to the UI elements 40 shown in FIGS. 1A-1D, the UI elements 62 can be selected via gaze and may be referred to as gaze-selectable elements.

Figure 1F:
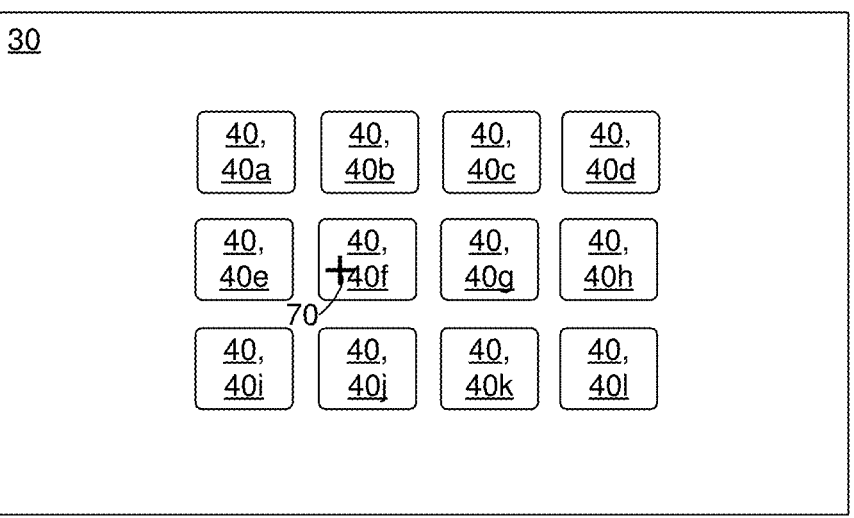
Figure 1G:
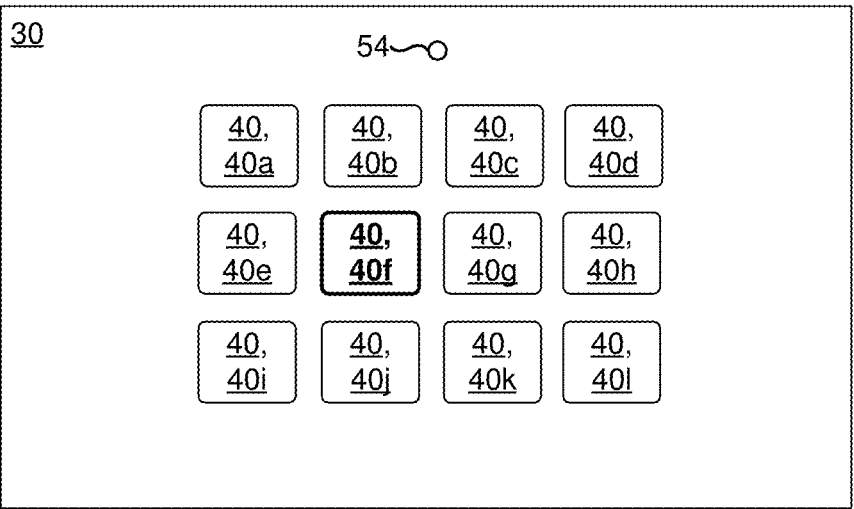

Referring to FIGS. 1F and 1G, the electronic device 20 detects a gaze input 70 directed to the sixth UI element 40f. As illustrated in FIG. 1G, the electronic device 20 displays the visual indicator 54 in response to detecting the gaze input 70 directed to the sixth UI element 40f. The electronic device 20 changes a visual appearance of the sixth UI element 40f so that the sixth UI element 40f appears different from the remaining UI elements 40. For example, a text of the sixth UI element 40f is shown in bold and a border of the sixth UI element 40f is shown with a thicker line. Changing the visual appearance of the sixth UI element 40f indicates that gazing at the visual indicator 54 will confirm a selection of the sixth UI element 40f thereby triggering the electronic device 20 to perform a sixth UI operation associated with the sixth UI element 40f.

Figure 1H:
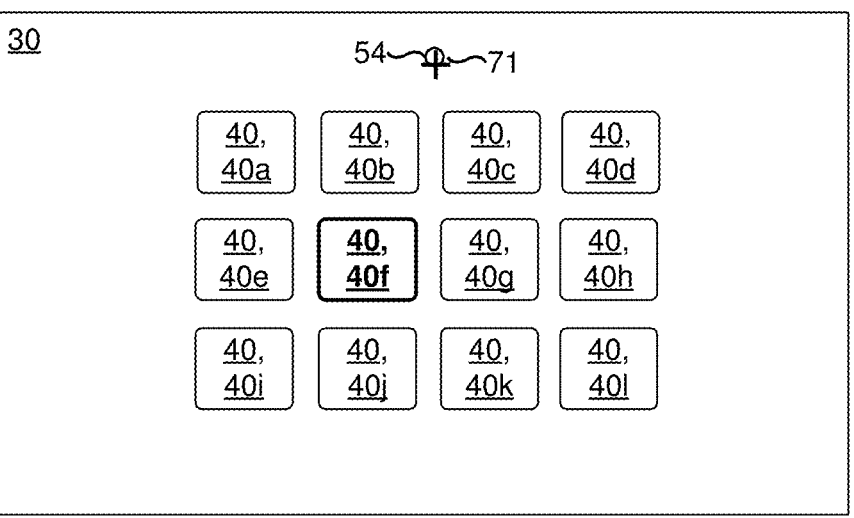
Figure 1I:
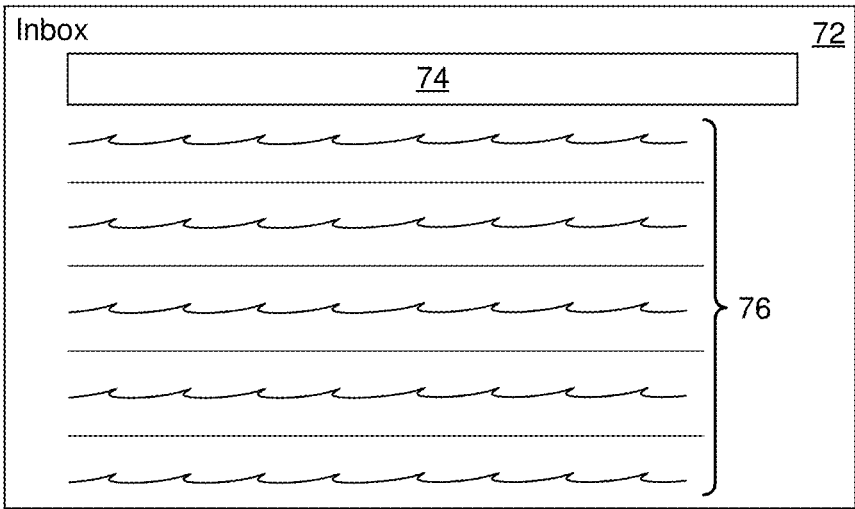

Referring to FIG. 1H, the electronic device 20 detects a gaze input 71 directed to the visual indicator 54. The gaze input 71 confirms a user selection of the sixth UI element 40*f*. In response to detecting the gaze input 71 confirming the user selection of the sixth UI element 40*f*, the electronic device 20 performs the sixth UI operation associated with the sixth UI element 40*f*. As illustrated in FIG. 1I, the electronic device 20 displays a mail application home page 72. In some implementations, the sixth UI element 40*f* is a mail application icon that triggers the electronic device 20 to launch a mail application and display the mail application home page 72. The mail application home page 72 includes a search bar 74 for searching through messages and messages 76 received by the electronic device 20.

Figure 1J:
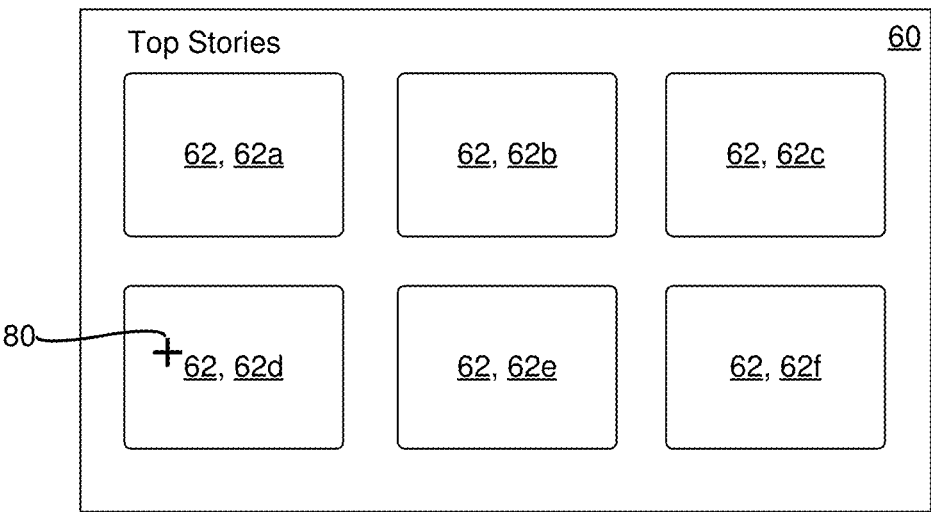
Figure 1K:
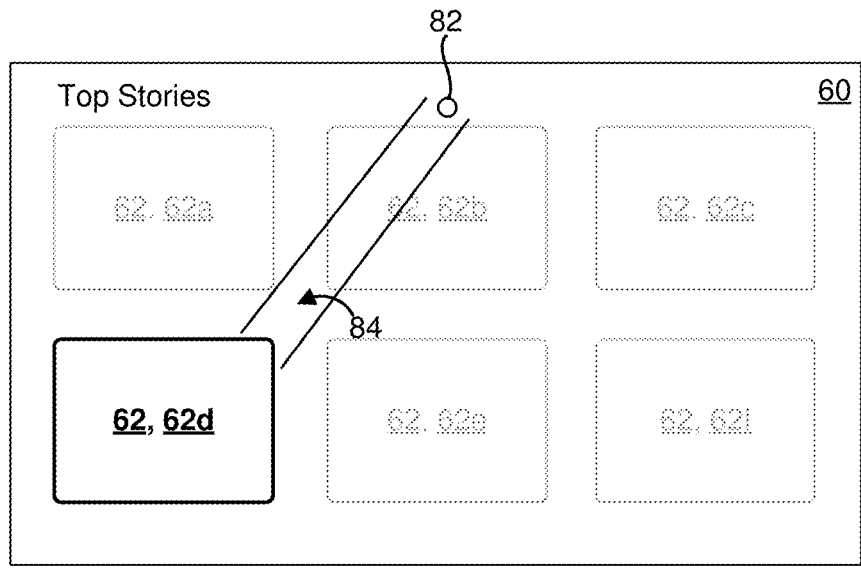

FIG. 1J illustrates a gaze input 80 directed to the UI element 62*d* representing a fourth news story displayed by the news application within the news home page 60. As illustrated in FIG. 1K, in response to detecting the gaze input 80, the electronic device 20 displays a visual indicator 82 for confirming a user selection of the UI element 62*d*. The electronic device 20 also changes respective visual appearances of the UI elements 62. In the example of FIG. 1K, the electronic device 20 displays the UI element 62*d* in bold and with a thicker border, and the electronic device 20 displays a remainder of the UI elements 62 in gray and with a narrower border. Changing the visual appearance of the UI element 62*d* relative to a remainder of the UI elements 62 indicates that the UI element 62*d* has been preliminary selected and that the user 12 needs to gaze at the visual indicator 82 in order to confirm the selection of the UI element 62*d*.

FIG. 1K illustrates an expected gaze travel path 84 from the UI element 62*d* to the visual indicator 82. In some implementations, the electronic device 20 maintains a preliminary selection of the UI element 62*d* and continues to display the visual indicator 82 while the gaze of the user 12 is traveling from the UI element 62*d* to the visual indicator 82 and the gaze stays within a boundary defining the expected gaze travel path 84. If the electronic device 20 detects that the gaze is not traveling along the expected gaze travel path 84 or the gaze breaches (e.g., goes outside of) the boundary defining the expected gaze travel path 84, then the electronic device 20 ceases to display the visual indicator 82 and deselects (e.g., cancels the preliminary selection of) the UI element 62*d*.

Figure 1L:
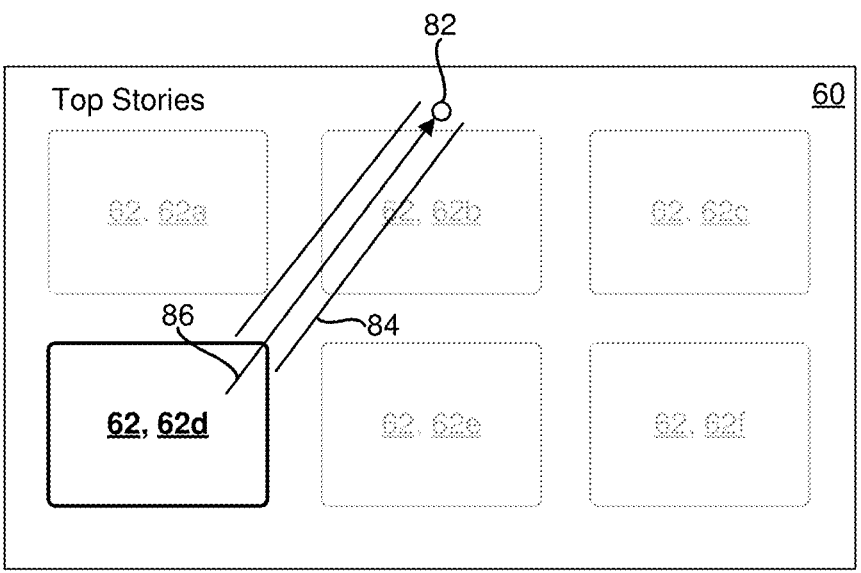

FIG. 1L illustrates an actual gaze travel path 86 that stays within the boundary defining the expected gaze travel path 84. Since the actual gaze travel path 86 does not include gaze positions that are outside the boundary defining the expected gaze travel path 84, the electronic device 20 maintains the preliminary selection of the UI element 62*d* and continues to display the visual indicator 82 while the gaze is traveling along the actual gaze travel path 86.

Figure 1M:
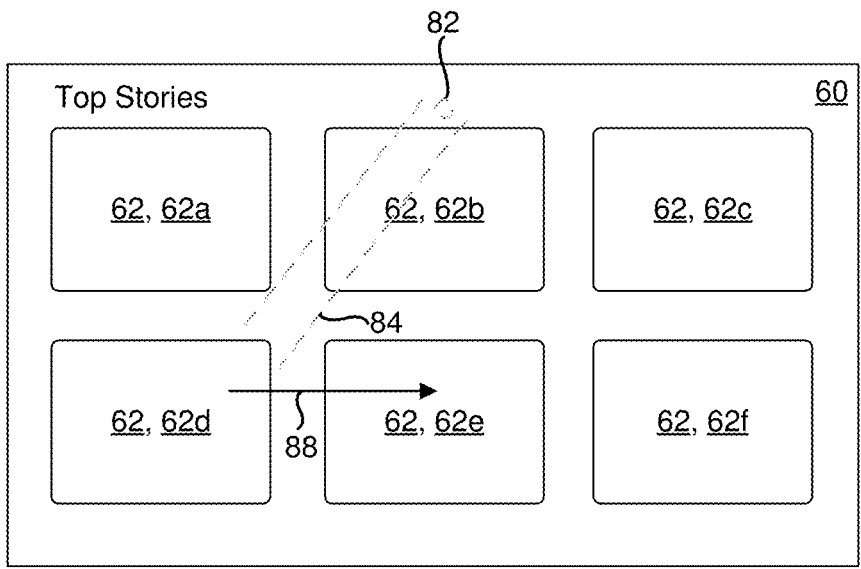

FIG. 1M illustrates an actual gaze travel path 88 that breaches the boundary defining the expected gaze travel path 84. In the example of FIG. 1M, the actual gaze travel path 88 goes from the UI element 62*d* to the UI element 62*e*. Since the actual gaze travel path 88 includes gaze positions that are outside the boundary defining the expected gaze travel path 84, the electronic device 20 ceases to maintain the preliminary selection of the UI element 62*d* (e.g., as indicated by a blackening of text included within a remainder of the UI elements 62) and displays a fading away of the visual indicator 82 (e.g., as indicated by a graying of the visual indicator 82). The expected gaze travel path 84 dissipates (e.g., as indicated by a graying of the boundary defining the expected gaze travel path 84) and the visual indicator 82 gradually disappears (e.g., as indicated by a graying of the visual indicator 82) as the actual gaze travel path 88 goes outside of the boundary defined by the expected gaze travel path 84.

Figure 1N:
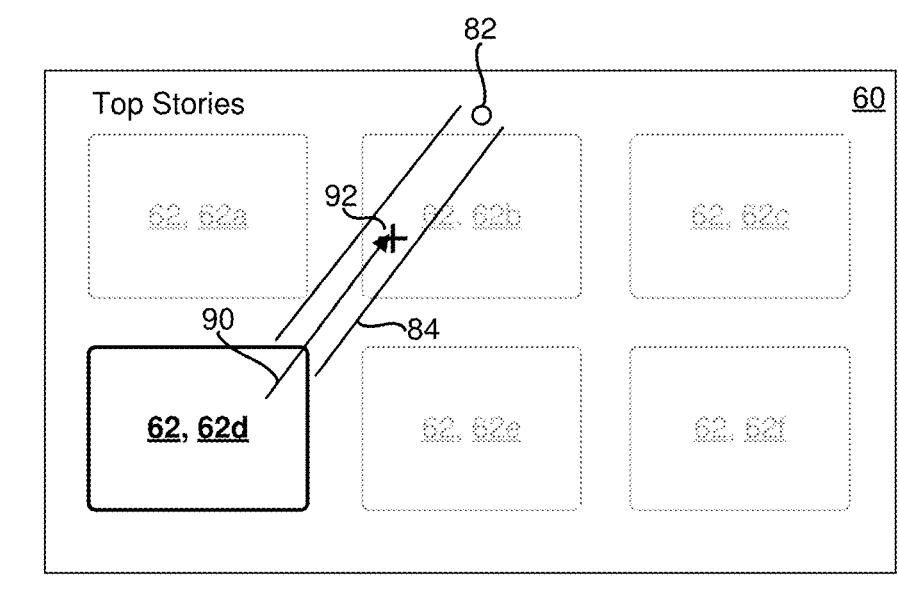
Figure 1O:
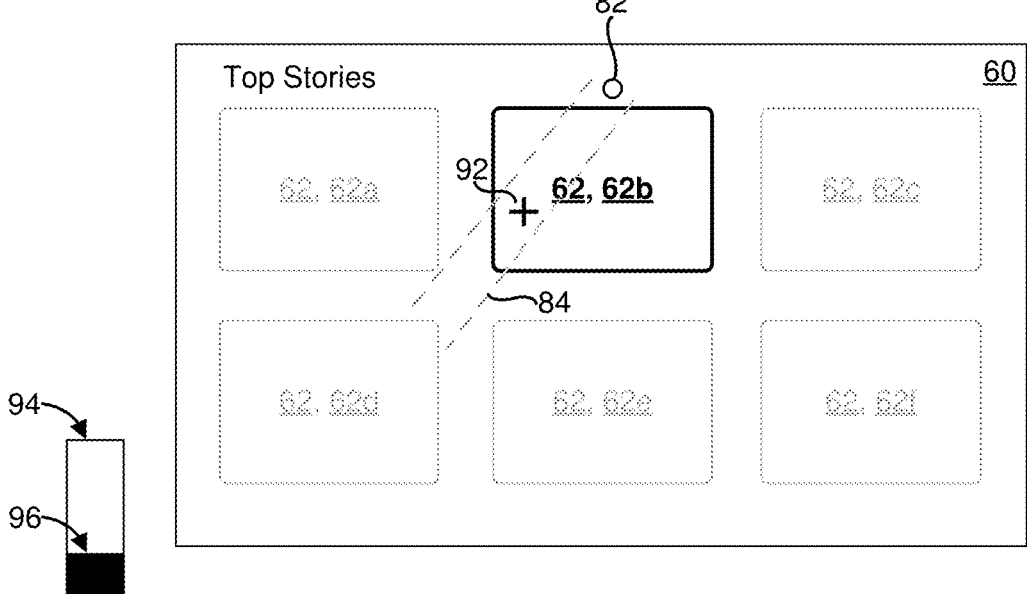

FIGS. 1N and 1O illustrate a sequence in which the gaze lingers over the UI element 62*b* that coincides with the expected gaze travel path 84. FIG. 1N illustrates an actual gaze travel path 90 that ends with a gaze position 92. While the gaze is moving along the actual gaze travel path 90, the gaze remains stationary at the gaze position 92 for a time duration 94 that exceeds a threshold time duration 96. Since the gaze remains stationary at the gaze position 92 that corresponds to a location of the UI element 62*b*, the electronic device 20 determines that the user 12 likely intends to select the UI element 62*b*. As such, the electronic device 20 cancels the selection of the UI element 62*d* and the electronic device 20 preliminary selects UI element 62*b*. In FIGS. 1N and 1O, the deselection of the UI element 62*d* is shown as a change of text color from black to gray and the preliminary selection of the UI element 62*b* is shown as a change of text color from gray to black.

In FIG. 1O, the electronic device 20 displays a dissipation of the expected gaze travel path 84 by displaying the expected gaze travel path 84 in gray. In FIG. 1O, the electronic device 20 maintains the display of the visual indicator 82. However, in FIG. 1O, the visual indicator 82 serves as a confirmation for selecting the UI element 62*b* and not the UI element 62*d* as indicated by the UI element 62*b* being shown in black and the UI element 62*d* being shown in gray. In some implementations, the gaze remaining stationary at the gaze position 92 refers to a microsaccade of the gaze at or near the gaze position 92. As such, minor movement of the gaze near the gaze position 92 is still considered as the user 12 fixating on the UI element 62*b*. More generally, detecting a microsaccade of the gaze as the gaze travels along the expected gaze travel path 84 may trigger the electronic device 20 to deselect a preliminary selected UI element and preliminary select another UI element where the microsaccade is occurring.

Figure 1P:
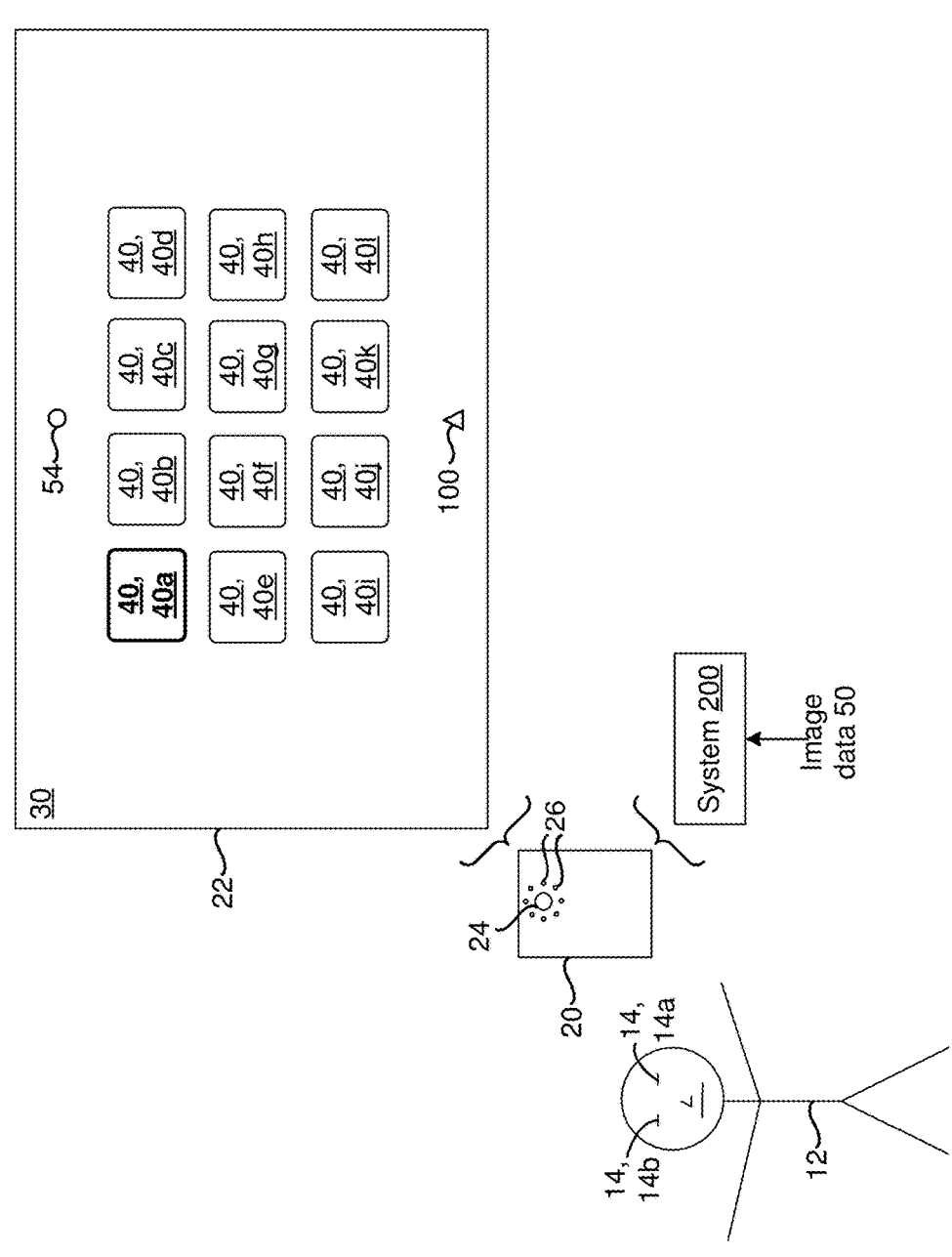

FIG. 1P illustrates the UI 30 after the first UI element 40*a* has been preliminary selected via gaze (e.g., after the electronic device 20 has detected the gaze input 52 shown in FIG. 1B). Similar to FIG. 1C, the electronic device 20 displays the visual indicator 54 in order to confirm the selection of the first UI element 40*a*. However, the electronic device 20 additionally displays a second visual indicator 100. The first UI element 40*a* may be associated with multiple UI operations. For example, the first UI element 40*a* corresponds to a news application icon, a first UI operation associated with the news application icon includes launching the news application and displaying a news application home page as shown in FIG. 1E, and a second UI operation associated with the news application icon includes launching the news application and displaying a 'my sports' page that shows sports related news and recent scores of favorited sports teams (as shown in FIG. 1R).

In the example of FIG. 1P, the visual indicator 54 is associated with the first UI operation (e.g., opening the new application home page) and the second visual indicator 100 is associated with the second UI operation (e.g., opening the 'my sports' page). As such, gazing at the visual indicator 54 serves as a confirmation for opening the news application to the news application home page (as shown in FIG. 1E) and gazing at the second visual indicator 100 serves as a confirmation for opening the news application to the 'my sports' page (as shown in FIG. 1R).

Figure 1Q:
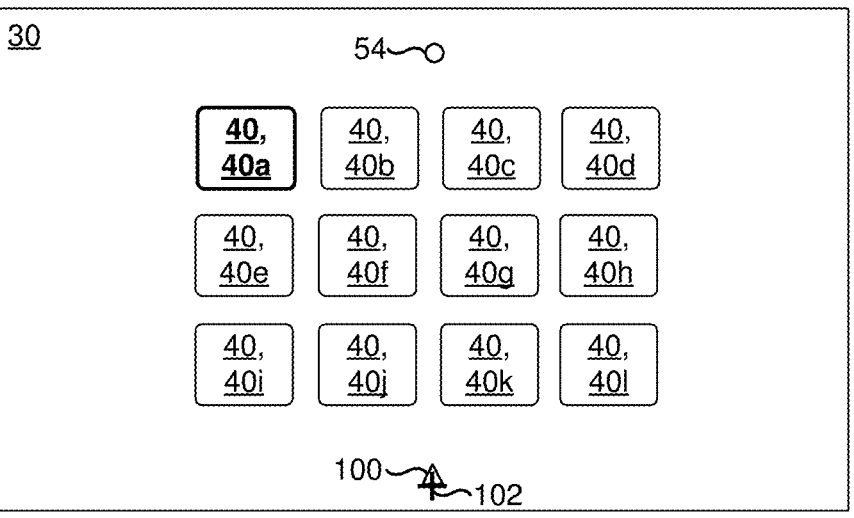
Figure 1R:
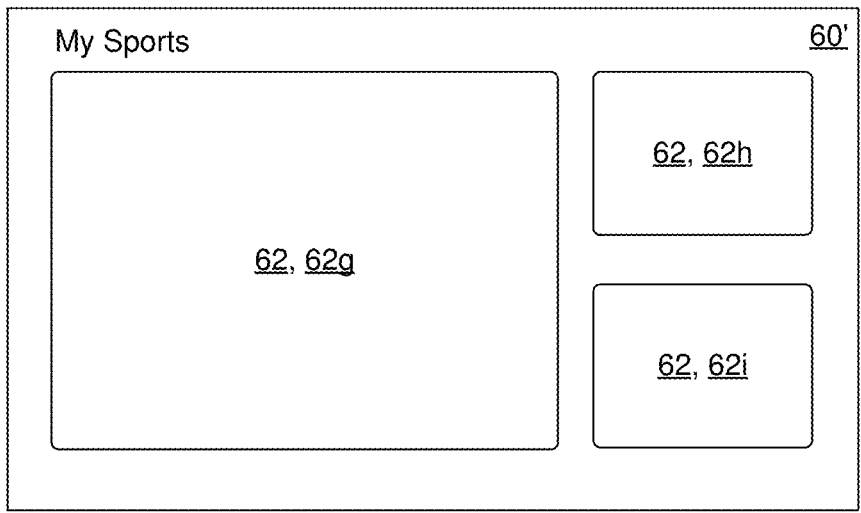

Referring to FIG. 1Q, the electronic device 20 detects a gaze input 102 directed to the second visual indicator 100. The gaze input 102 corresponds to a request to perform the second UI operation associated with the first UI element 40a. For example, the gaze input 102 corresponds to a request to open the news application to the 'my sports' page instead of opening the news application to the news application home page. As such, in response to detecting the gaze input 102 at a location corresponding to the second visual indicator 100, the electronic device 20 opens the news application to a 'my sports' page 60' that includes UI elements 62g, 62h and 62i that represent sports-related news.

Figure 1S:
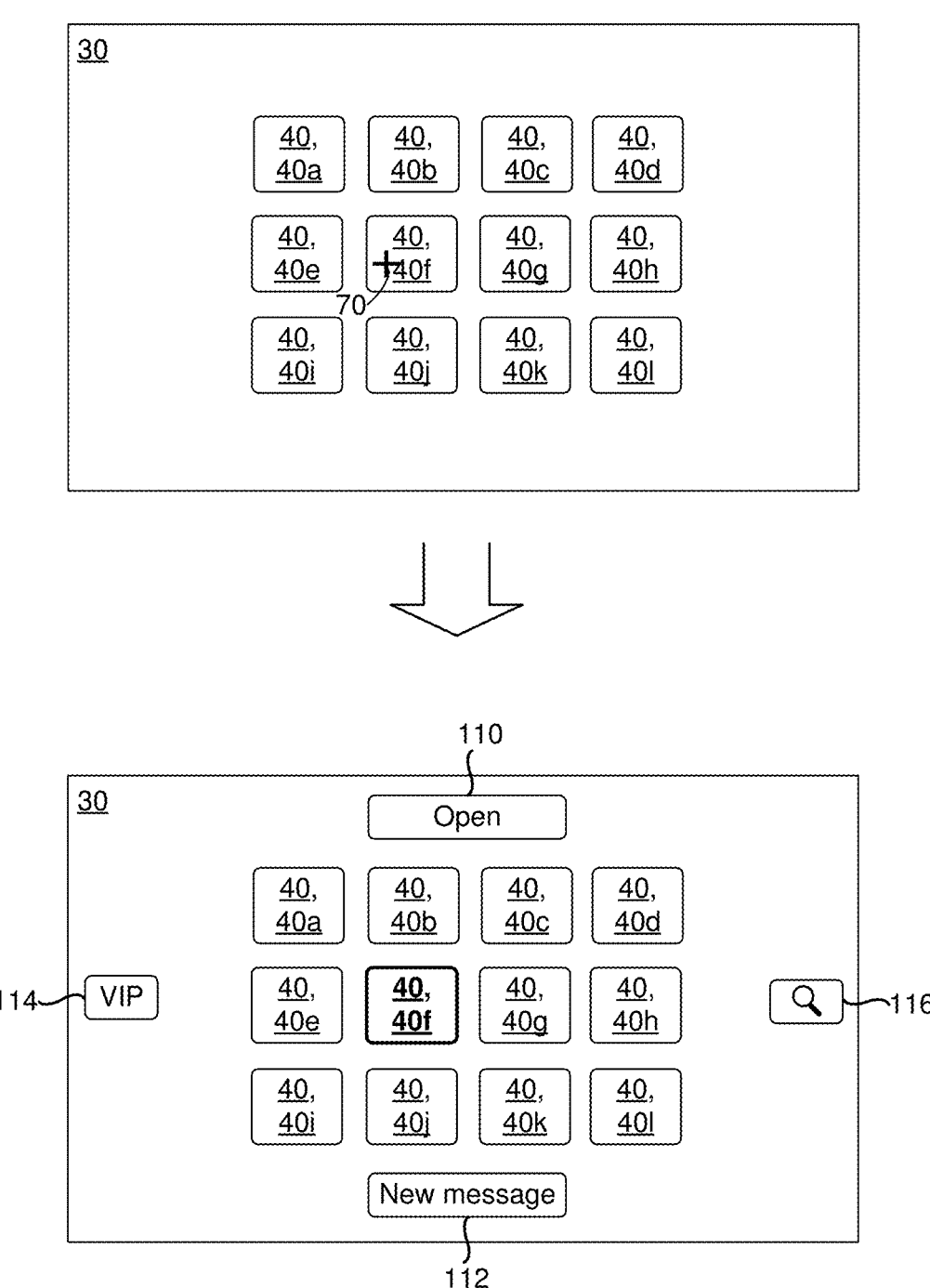

Referring to FIG. 1S, the sixth UI element 40f (e.g., the mail application icon) may be associated with four UI operations: a first UI operation that opens the mail application to a default state (e.g., the Inbox), a second UI operation that opens a new message composition window generated by the mail application, a third UI operation that opens a VIP messages folder with a subset of messages that have been marked as 'VIP', and a fourth UI operation that opens a search bar to search for messages. After the electronic device 20 detects the gaze input 70 directed to the sixth UI element 40f, the electronic device 20 displays four separate buttons for triggering a corresponding one of the four UI operations associated with the mail application icon.

In the example of FIG. 1S, the electronic device 20 displays an open button 110 near a top edge of the display 22. The open button 110 operates similar to the visual indicator 54 shown in FIG. 1G. As such, gazing at the open button 110 triggers the electronic device 20 to perform the first UI operation and open the mail application to the default state as shown in FIG. 1I. In addition to displaying the open button 110, the electronic device 20 displays a new message button 112 near a bottom edge of the display 22. The new message button 112 is associated with the second UI operation of opening a new message composition window. As such, gazing at the new message button 112, triggers the electronic device 20 to perform the second UI operation and open the mail application to the new message composition window thereby reducing the need for the user 12 to provide an additional user input that corresponds to a request to open the new message composition window after launching the mail application.

In addition to displaying the open button 110 and the new message button 112, the electronic device 20 displays a VIP messages button 114 near a left edge of the display 22. The VIP messages button 114 is associated with the third UI operation of opening the VIP messages folder. As such, gazing at the VIP messages button 114, triggers the electronic device 20 to perform the third UI operation and opens the mail application to the VIP messages folder thereby reducing the need for the user 12 to provide an additional user input that corresponds to a request to open the VIP messages folder after launching the mail application.

In addition to displaying the open button 110, the new message button 112 and the VIP messages button 114, the electronic device 20 displays a search button 116 near a right edge of the display 22. The search button 116 is associated with the fourth UI operation of opening the search bar. As such, gazing at the search button 116, triggers the electronic device 20 to perform the fourth UI operation of opening the mail application to the search bar and placing a cursor in the search bar to indicate that the electronic device 20 is ready to accept a search string thereby reducing the need for the user 12 to provide an additional user input that corresponds to selecting the search bar after launching the mail application.

FIG. 1S illustrates that the visual indicator 54 shown in FIGS. 1C, 1D, 1G and 1H can be replaced with a button that includes text. The text may provide an indication of the UI operation that the electronic device 20 will perform when the user 12 gazes upon the visual indicator 54. Referring back to FIG. 1C, in some implementations, the visual indicator 54 may include the same text as the first UI element 40a to indicate that gazing at the visual indicator 54 serves as a confirmation for selecting the first UI element 40a and performing the UI operation associated with the first UI element 40a.

Figure 2:
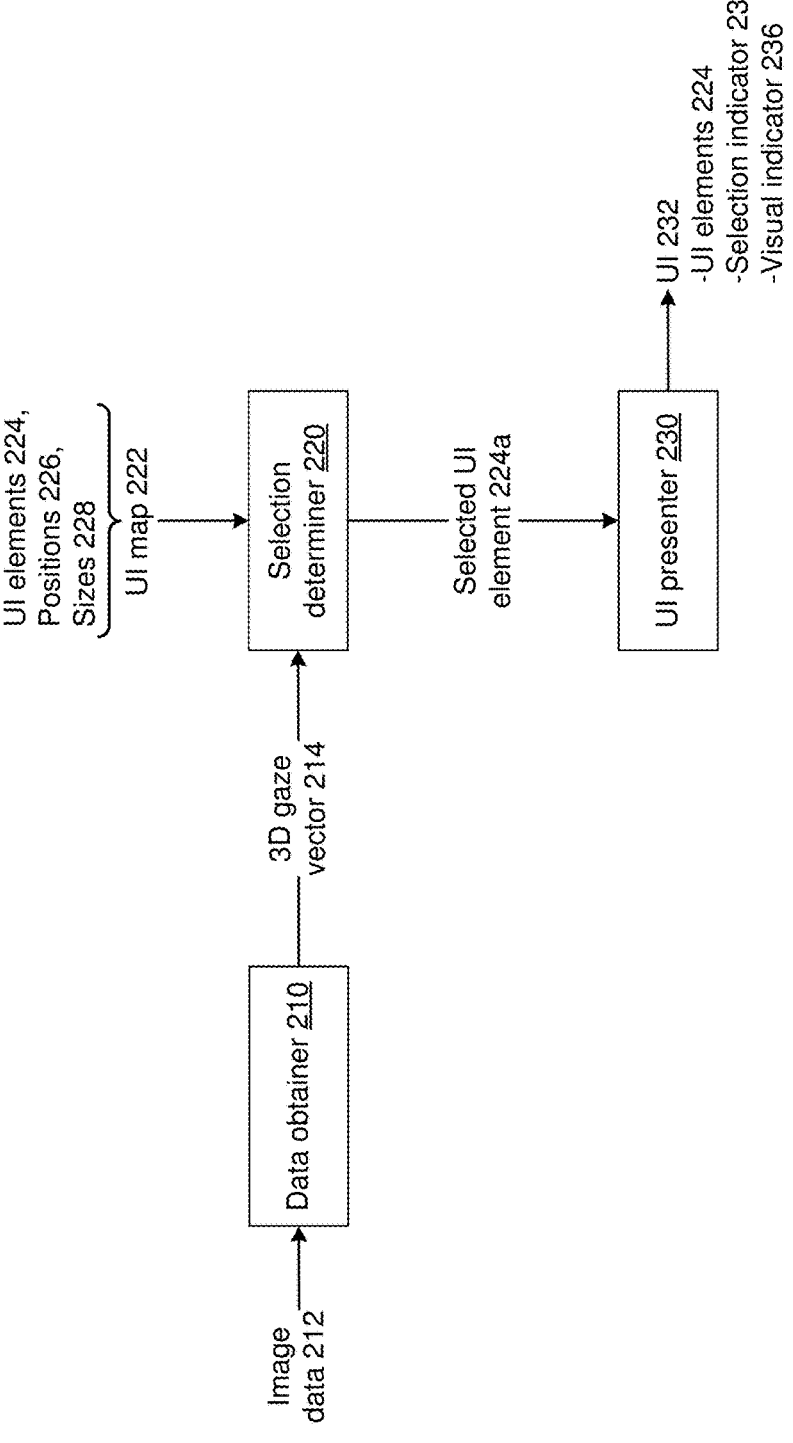
FIG. 2 is a diagram of an eye tracking system in accordance with some implementations.

FIG. 2 is a block diagram of the system 200 in accordance with some implementations. In various implementations, the system 200 includes data obtainer 210, a selection determiner 220 and a UI presenter 230 that presents a UI 232 with various UI elements 224 (e.g., the UI 30 with the UI elements 40 shown in FIG. 1A). In various implementations, the data obtainer 210 obtains image data 212 from an eye tracking camera (e.g., the image data 50 shown in FIG. 1A). In various implementations, the data obtainer 210 generates a three-dimensional (3D) gaze vector 214 (hereafter "gaze vector 214") based on the image data 212. For example, referring to FIGS. 1A and 1B, the data obtainer 210 obtains the image data 50 from the image sensor 24 and the gaze vector 214 indicates the gaze input 52. In some implementations, the data obtainer 210 performs pupil detection and glint detection to generate the gaze vector 214. In some implementations, the gaze vector 214 indicates an origin of a gaze of the user and a direction of the gaze. In some implementations, the gaze vector 214 indicates a gaze position, a gaze direction, a gaze intensity and/or a gaze shape.

In some implementations, the gaze vector 214 includes a first gaze vector for a first eye (e.g., the left eye 14a shown in FIG. 1A) and a second gaze vector for a second eye (e.g., the right eye 14b shown in FIG. 1A). In some implementations, the gaze vector 214 represents an average of the first gaze vector for the first eye and the second gaze vector for the second eye. For example, a gaze direction indicated by the gaze vector 214 may be an average of a first gaze direction of a first eye and a second gaze direction of a second eye. In some implementations, the first gaze vector for the first eye is associated with a first confidence score and the second gaze vector for the second eye is associated with a second confidence score. In such implementations, the gaze vector 214 includes one of the first gaze vector and the second gaze vector based on their corresponding confidence scores (e.g., the data obtainer 210 selects the gaze vector with the higher confidence score).

In various implementations, the selection determiner 220 determines which of the UI elements 224 has been selected via a gaze input indicated by the 3D gaze vector 214. In some implementations, the selection determiner 220 obtains a UI map 222 for the UI 232. The UI map 222 indicates the UI elements 224, respective positions 226 of the UI elements 224 and respective sizes 228 of the UI elements 224. The selection determiner 220 utilizes the UI map 222 to determine that a gaze position indicated by the 3D gaze vector 214 corresponds to (e.g., overlaps with) a location of a particular one of the UI elements 224. The particular one of the UI elements 224 that the gaze is directed to is referred to as a selected UI element 224a. The selection determiner 220 provides an indication of the selected UI element 224a to the UI presenter 230.

In various implementations, the UI presenter 230 presents the UI 232 with the UI elements 224 (e.g., the UI 30 with the UI elements 40 shown in FIG. 1A). In some implementations, the UI presenter 230 presents a selection indicator 234 to indicate the selected UI element 224a. The selection indicator 234 indicates that a user has preliminary selected the selected UI element 224a. For example, with reference to FIG. 1C, the UI presenter 230 displays the first UI element 40a with a different visual characteristic than a remainder of the UI elements 40 (e.g., by displaying text of the first UI element 40a in bold while not displaying text of the remainder of the UI elements 40 in bold).

In various implementations, the UI presenter 230 presents a visual indicator 236 in order to allow the user to confirm the selection of the selected UI element 224a. For example, the UI presenter 230 displays the visual indicator 54 shown in FIG. 1C. After the UI presenter 230 presents the visual indicator 236, the data obtainer 210 obtains subsequent image data indicating a gaze input directed to the visual indicator 236 (e.g., the gaze input 56 shown in FIG. 1D). In response to detecting the gaze input directed to the visual indicator 236, the UI presenter 230 displays performance of a UI operation associated with the selected UI element 224a (e.g., the UI presenter 230 displays the news home page 60 shown in FIG. 1E).

In some implementations, after presenting the visual indicator 236, the UI presenter 230 determines an expected gaze travel path from the selected UI element 224a to the visual indicator 236 (e.g., the expected gaze travel path 84 shown in FIG. 1K). In some implementations, the UI presenter 230 renders a subset of the UI elements 224 that overlap with the expected gaze travel path unselectable while a gaze of the user is traveling along the expected gaze travel path. For example, as shown in FIG. 1L, movement of the gaze along the actual gaze travel path 86 does not result in a selection of the UI element 62b.

FIG. 3 is a flowchart representation of a method 300 for selecting a user interface element based on gaze. In various implementations, the method 300 is performed by the system 200 shown in FIGS. 1A-2. In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes displaying, on the display, a user interface (UI) including a first UI element that is associated with a first UI operation and a second UI element that is associated with a second UI operation. For example, as shown in FIG. 1A, the electronic device 20 displays the UI elements 40 that are associated with respective UI operations.

As represented by block 310a, in some implementations, the UI includes a plurality of elements with spacings that are less than a threshold (e.g., distances between the UI elements are less than the threshold). For example, as shown in FIG. 1A, the UI 30 includes UI elements 40 that are displayed in a grid with insufficient spacing to display dedicated virtual indicators for each of the UI elements 40.

As represented by block 310b, in some implementations, the first UI element includes a first icon, a first button, a first link or a first multimedia content item, and the second UI element includes a second icon, a second button, a second link or a second multimedia content item. For example, as shown in FIG. 1A, the UI elements 40 represent icons for launching respective applications.

As represented by block 320, in some implementations, in response to detecting, via the eye tracker, a first gaze input directed to one of the first UI element and the second UI element, displaying a visual indicator at a fixed location that is separate from the first UI element and the second UI element. For example, as shown in FIGS. 1B-1C, the electronic device 20 displays the visual indicator 54 in response to detecting the gaze input 52 directed to the first UI element 40a and, as shown in FIGS. 1F-1G, the electronic device 20 displays the visual indicator 54 in response to detecting the gaze input 70 directed to the sixth UI element 40f.

As represented by block 320a, in some implementations, the fixed location is equidistant from the first UI element and the second UI element. In some implementations, the visual indicator is displayed at the fixed location regardless of which UI element was gazed upon so that the user does not have to search of the visual indicator in order to confirm selection of the UI element that the user gazed upon.

As represented by block 320b, in some implementations, displaying the visual indicator includes, in response to the first gaze input being directed to the first UI element, displaying the visual indicator with a first visual appearance that matches a first visual characteristic of the first UI element. In some implementations, the first visual characteristic of the first UI element includes a first color of the first UI element and displaying the visual indicator with the first visual appearance includes displaying the visual indicator with the first color. For example, in FIG. 1C the electronic device 20 can display the visual indicator 54 with a first color that matches a background color of the first UI element 40a. In some implementations, in response to the first gaze input being directed to the second UI element, displaying the visual indicator with a second visual appearance that matches a second visual characteristic of the second UI element. In some implementations, the second visual characteristic of the second UI element includes a second color of the second UI element and displaying the visual indicator with the second visual appearance includes displaying the visual indicator with the second color. For example, in FIG. 1G the electronic device 20 can display the visual indicator 54 with a second color that matches a background color of the sixth UI element 40f. In some implementations, the method 300 includes displaying the visual indicator with a predetermined color and changing a background color or a font color of the first UI element to the predetermined color after detecting the first gaze input directed to the first UI element.

In some implementations, the first visual characteristic of the first UI element includes a first shape of the first UI element and displaying the visual indicator with the first visual appearance includes displaying the visual indicator with the first shape. As an example, if the first UI element is rectangular then the visual indicator is displayed as a rectangle. As another example, if the first UI element is rectangular with rounded corners then the visual indicator is displayed as a rectangle. In some implementations, the second visual characteristic of the second UI element includes a second shape of the second UI element and displaying the visual indicator with the second visual appearance includes displaying the visual indicator with the second shape. As an example, if the second UI element is oval then the visual indicator is displayed as an oval. As another example, if the second UI element is circular then the visual indicator is displayed as a circle. In some implementations, the method 300 includes changing a shape of the first UI element after detecting the first gaze input directed to the first UI element (e.g., changing a shape of the first UI element from rectangular to oval).

As represented by block 320c, in some implementations, the method 300 includes associating the visual indicator with the first UI operation in response to the first gaze input being directed to the first UI element such that gazing at the visual indicator confirms a user selection of the first UI element and triggers performance of the first UI operation associated with the first UI element. For example, as shown in FIG. 1K, the association between the visual indicator 82 and the UI element 62d is indicated by displaying the UI element 62d in black while graying out the remaining UI elements 62a, 62b, 62c, 62e and 62f. In some implementations, the method 300 includes associating the visual indicator with the second UI operation in response to the first gaze input being directed to the second UI element such that gazing at the visual indicator confirms a user selection of the second UI element and triggers performance of the second UI operation associated with the second UI element. For example, as shown in FIG. 1O, the association between the visual indicator 82 and the UI element 62b is indicated by displaying the UI element 62b in black and graying out the remaining UI elements 62a, 62c, 62d, 62e and 62f.

As represented by block 320d, in some implementations, the method 300 includes while displaying the visual indicator at the fixed location, displaying a second visual indicator at a second fixed location separate from the first and second UI elements. For example, as shown in FIG. 1P, the electronic device 20 concurrently displays the visual indicator 54 at the fixed location (e.g., near the top of the display) and the second visual indicator 100 at a second fixed location (e.g., near the bottom of the display). In some implementations, gazing at the second visual indicator triggers performance of a third UI operation associated with the first UI element when the first gaze input is directed to the first UI element. In some implementations, the third UI operation includes a first quick action related to a first application that the first UI element represents. For example, as shown in FIGS. 1Q and 1R, gazing at the second visual indicator 100 triggers the electronic device 20 to display the 'my sports' page of the news application. In some implementations, gazing at the second visual indicator triggers performance of a fourth UI operation associated with the second UI element when the first gaze input is directed to the second UI element. In some implementations, the fourth UI operation includes a second quick action related to a second application that the second UI element represents. For example, as shown in FIG. 1S, the electronic device 20 displays the new message button 112 for opening the new message composition window.

As represented by block 330, in various implementations, the method 300 includes in response to detecting, via the eye tracker, a second gaze input directed to the visual indicator, performing the first UI operation in response to the first gaze input being directed to the first UI element. For example, as shown in FIGS. 1B-1E, the electronic device 20 opens the news application home page when the news application icon was the last icon that the user 12 gazed at prior to gazing at the visual indicator 54. In some implementations, the method 300 includes in response to detecting, via the eye tracker, the second gaze input directed to the visual indicator, performing the second UI operation in response to the first gaze input being directed to the second UI element. For example, as shown in FIGS. 1F-1I, the electronic device 20 opens the mail application home page when the mail application icon was the last icon that the user 12 gazed at prior to gazing at the visual indicator 54.

As represented by block 330a, in some implementations, the method 300 includes in response to the first gaze input being directed to the first UI element, maintaining selection of the first UI element while a gaze is traveling along a first path from the first UI element to the visual indicator, and in response to the first gaze input being directed to the second UI element, maintaining selection of the second UI element while the gaze is traveling along a second path from the second UI element to the visual indicator. For example, as shown in FIG. 1L, the electronic device 20 maintains the selection of the UI element 62d as the gaze travels along the actual gaze travel path 86 which is within a boundary defining the expected gaze travel path 84.

In some implementations, the method 300 includes dismissing the selection of the first UI element when the gaze remains fixated on a third UI element that is on the first path from the first UI element to the visual indicator, and dismissing the selection of the second UI element when the gaze remains fixated on a fourth UI element that is on the second path from the second UI element to the visual indicator. For example, as shown in FIGS. 1N and 1O, the electronic device 20 dismisses the selection of the UI element 62d upon detecting a microsaccade (e.g., a fixation with minor eye movement within a tolerance threshold) at a location corresponding to the UI element 62b that is on the expected gaze travel path 84.

In some implementations, the method 300 includes dismissing the selection of the first UI element when the gaze is not moving along the first path from the first UI element towards the visual indicator, and dismissing the selection of the second UI element when the gaze is not moving along the second path from the second UI element towards the visual indicator. For example, as shown in FIG. 1M, the electronic device 20 dismisses the selection of the UI element 62d upon detecting the actual gaze travel path 88 that deviates from the expected gaze travel path 84.

As represented by block 330b, in some implementations, the user interface includes a home screen, the first UI element includes a first icon for launching a first application, the second UI element includes a second icon for launching a second application, performing the first UI operation includes launching the first application in response to the first gaze input being directed to the first icon and the second gaze input being directed to the visual indicator, and performing the second UI operation includes launching the second application in response to the first gaze input being directed to the second icon and the second gaze input being directed to the visual indicator. For example, as shown in FIGS. 1A-1I, the UI 30 includes a grid of icons, the first UI element 40a includes a news application icon for launching the news application and the sixth UI element 40f includes a mail application icon for launching the mail application.

In some implementations, the first UI element includes a first user-selectable link for opening a first page, the second UI element includes a second user-selectable link for opening a second page, performing the first UI operation includes opening the first page in response to the first gaze input being directed to the first user-selectable link and the second gaze input being directed to the visual indicator, and performing the second UI operation includes opening the second page in response to the first gaze input being directed to the second user-selectable link and the second gaze input being directed to the visual indicator. For example, as shown in FIG. 1E, the UI elements 62 represent news stories and the user 12 can select the UI elements 62 to view the expanded versions of the news stories.

In some implementations, the method 300 includes detecting the first gaze input at a first time and detecting the second gaze input at a second time that is within a threshold time period of the first time. In some implementations, the device starts a timer in response to detecting the first gaze input. In such implementations, the device waits for the second gaze input until the timer expires. If the device detects the second gaze input before the timer expires, the device performs the UI operation associated with the UI element that the first gaze input was directed to. However, if the device does not detect the second gaze input before the timer expires, the device ceases to display the visual indicator and the device deselects the UI element that the first gaze input selected. As such, after gazing at a UI element the user is provided with a limited amount of time to gaze at the visual indicator in order to confirm the selection of the UI element that the user gazed at. If the user does not gaze at the visual indicator to confirm the selection of the UI element after gazing at the UI element, then the UI element is unselected and the visual indicator is no longer displayed. In some implementations, a time duration of the timer is a function of (e.g., proportional to) a distance between the UI element that was selected and the visual indicator.

Figure 4:
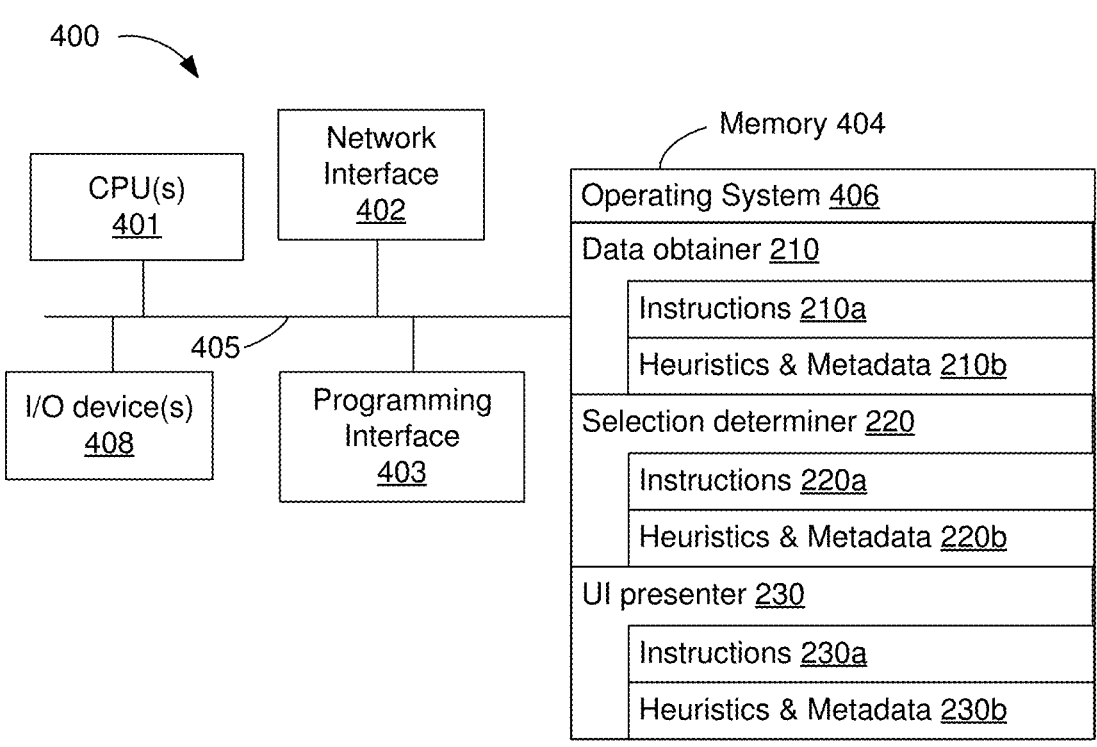
FIG. 4 is a block diagram of a device that selects a user interface element based on gaze in accordance with some implementations.

FIG. 4 is a block diagram of a device 400 in accordance with some implementations. In some implementations, the device 400 implements the electronic device 20 shown in FIG. 1A and/or the system 200 shown in FIGS. 1A and 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 408, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the one or more I/O devices 408 include a display (e.g., the display 22 shown in FIG. 1A). In some implementations, the display includes an XR display. In some implementations, the display includes an opaque display. Alternatively, in some implementations, the display includes an optical see-through display. In some implementations, the one or more I/O devices 408 include an eye tracker (e.g., the system 200 shown in FIGS. 1A and 2). In some implementations, the one or more I/O devices 408 include an image sensor (e.g., the image sensor 24 shown in FIG. 1A). In some implementations, the one of more I/O devices 408 include a glint source (e.g., the glint source 26 shown in FIG. 1A).

In some implementations, the memory 404 or the non-transitory computer readable storage medium of the memory 404 stores the following programs, modules and data structures, or a subset thereof including an optional operating system 406, the data obtainer 210, the selection determiner 220 and the UI presenter 230. In various implementations, the data obtainer 210 includes instructions 210a, and heuristics and metadata 210b for obtaining image data that indicates a gaze input (e.g., the image data 50 shown in FIG. 1A indicating the gaze input 52 shown in FIG. 1B and the gaze input 56 shown in FIG. 1D). In various implementations, the selection determiner 220 includes instructions 220a, and heuristics and metadata 220b for identifying a particular UI element that the user selected via gaze (e.g., for identifying the selection of the first UI element 40a shown in FIG. 1C) In various implementations, the UI presenter 230 includes instructions 230a, and heuristics and metadata 230b for presenting a visual indicator that serves as a common secondary gaze input for confirming selection of the selected UI element (e.g., the visual indicator 54 shown in FIG. 1C).

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:

at an electronic device including a non-transitory memory, one or more processors, a display and an eye tracker:

displaying, on the display, a user interface (UI) including a first UI element that is associated with a first UI operation and a second UI element that is associated with a second UI operation;

in response to detecting, via the eye tracker, a first gaze input directed to one of the first UI element and the second UI element, displaying a visual indicator at a fixed location that is separate from the first UI element and the second UI element; and in response to detecting, via the eye tracker, a second gaze input directed to the visual indicator:

performing the first UI operation in response to the first gaze input being directed to the first UI element; and performing the second UI operation in response to the first gaze input being directed to the second UI element.

2. The method of claim 1, wherein the first UI element and the second UI element are a part of a plurality of UI elements with spacings that are less than a threshold.

3. The method of claim 1, wherein the fixed location is equidistant from the first UI element and the second UI element.

4. The method of claim 1, wherein displaying the visual indicator comprises:

in response to the first gaze input being directed to the first UI element, displaying the visual indicator with a first visual appearance that matches a first visual characteristic of the first UI element; and in response to the first gaze input being directed to the second UI element, displaying the visual indicator with a second visual appearance that matches a second visual characteristic of the second UI element.

5. The method of claim 4, wherein the first visual characteristic of the first UI element includes a first color of the first UI element and displaying the visual indicator with the first visual appearance comprises displaying the visual indicator with the first color; and wherein the second visual characteristic of the second UI element includes a second color of the second UI element and displaying the visual indicator with the second visual appearance comprises displaying the visual indicator with the second color.

6. The method of claim 4, wherein the first visual characteristic of the first UI element includes a first shape of the first UI element and displaying the visual indicator with the first visual appearance comprises displaying the visual indicator with the first shape; and wherein the second visual characteristic of the second UI element includes a second shape of the second UI element and displaying the visual indicator with the second visual appearance comprises displaying the visual indicator with the second shape.

7. The method of claim 1, further comprising:

associating the visual indicator with the first UI operation in response to the first gaze input being directed to the first UI element such that gazing at the visual indicator confirms a user selection of the first UI element and triggers performance of the first UI operation associated with the first UI element; and associating the visual indicator with the second UI operation in response to the first gaze input being directed to the second UI element such that gazing at the visual indicator confirms a user selection of the second UI element and triggers performance of the second UI operation associated with the second UI element.

8. The method of claim 1, further comprising:

while displaying the visual indicator at the fixed location, displaying a second visual indicator at a second fixed location separate from the first and second UI elements.

9. The method of claim 8, wherein gazing at the second visual indicator triggers performance of a third UI operation associated with the first UI element when the first gaze input is directed to the first UI element; and wherein gazing at the second visual indicator triggers performance of a fourth UI operation associated with the second UI element when the first gaze input is directed to the second UI element.

10. The method of claim 1, further comprising:

in response to the first gaze input being directed to the first UI element, maintaining selection of the first UI element while a gaze is traveling along a first path from the first UI element to the visual indicator; and in response to the first gaze input being directed to the second UI element, maintaining selection of the second UI element while the gaze is traveling along a second path from the second UI element to the visual indicator.

11. The method of claim 10, further comprising:

dismissing the selection of the first UI element when the gaze remains fixated on a third UI element that is on the first path from the first UI element to the visual indicator; and dismissing the selection of the second UI element when the gaze remains fixated on a fourth UI element that is on the second path from the second UI element to the visual indicator.

12. The method of claim 10, further comprising:

dismissing the selection of the first UI element when the gaze is not moving along the first path from the first UI element towards the visual indicator; and dismissing the selection of the second UI element when the gaze is not moving along the second path from the second UI element towards the visual indicator.

13. The method of claim 1, wherein:

the user interface comprises a home screen;

the first UI element comprises a first icon for launching a first application;

the second UI element comprises a second icon for launching a second application;

performing the first UI operation comprises launching the first application in response to the first gaze input being directed to the first icon and the second gaze input being directed to the visual indicator; and performing the second UI operation comprises launching the second application in response to the first gaze input being directed to the second icon and the second gaze input being directed to the visual indicator.

14. The method of claim 1, wherein:

the first UI element comprises a first user-selectable link for opening a first page;

the second UI element comprises a second user-selectable link for opening a second page;

performing the first UI operation comprises opening the first page in response to the first gaze input being directed to the first user-selectable link and the second gaze input being directed to the visual indicator; and performing the second UI operation comprises opening the second page in response to the first gaze input being directed to the second user-selectable link and the second gaze input being directed to the visual indicator.

15. The method of claim 1, wherein:

the first UI element comprises a first icon, a first button, a first link or a first multimedia content item; and the second UI element comprises a second icon, a second button, a second link or a second multimedia content item.

16. A device comprising:

a display;

an eye tracker;

one or more processors;

a non-transitory memory; and one or more programs stored in the non-transitory memory, which, when executed by the one or more processors, cause the device to:

display, on the display, a user interface (UI) including a first UI element that is associated with a first UI operation and a second UI element that is associated with a second UI operation;

in response to detecting, via the eye tracker, a first gaze input directed to one of the first UI element and the second UI element, display a visual indicator at a fixed location that is separate from the first UI element and the second UI element; and in response to detecting, via the eye tracker, a second gaze input directed to the visual indicator:

perform the first UI operation in response to the first gaze input being directed to the first UI element; and perform the second UI operation in response to the first gaze input being directed to the second UI element.

17. The device of claim 16, wherein the first UI element and the second UI element are a part of a plurality of UI elements with spacings that are less than a threshold.

18. The device of claim 16, wherein the fixed location is equidistant from the first UI element and the second UI element.

19. The device of claim 16, wherein displaying the visual indicator comprises:

in response to the first gaze input being directed to the first UI element, displaying the visual indicator with a first visual appearance that matches a first visual characteristic of the first UI element; and in response to the first gaze input being directed to the second UI element, displaying the visual indicator with a second visual appearance that matches a second visual characteristic of the second UI element.

20. A non-transitory memory storing one or more programs, which, when executed by one or more processors of a device with an eye tracker and a display, cause the device to:

display, on the display, a user interface (UI) including a first UI element that is associated with a first UI operation and a second UI element that is associated with a second UI operation;

in response to detecting, via the eye tracker, a first gaze input directed to one of the first UI element and the second UI element, display a visual indicator at a fixed location that is separate from the first UI element and the second UI element; and in response to detecting, via the eye tracker, a second gaze input directed to the visual indicator:

perform the first UI operation in response to the first gaze input being directed to the first UI element; and perform the second UI operation in response to the first gaze input being directed to the second UI element.

* * * * *